US007693975B2

(12) United States Patent
Sanchez

(10) Patent No.: US 7,693,975 B2
(45) Date of Patent: Apr. 6, 2010

(54) NETWORK DEVICE APPLYING KALMAN FILTER

(75) Inventor: Mauricio Sanchez, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1768 days.

(21) Appl. No.: 10/792,325

(22) Filed: Mar. 2, 2004

(65) Prior Publication Data

US 2005/0195748 A1   Sep. 8, 2005

(51) Int. Cl.
 *G06F 15/173* (2006.01)
 *H04L 12/26* (2006.01)
(52) U.S. Cl. ............... 709/223; 342/464; 342/451; 342/463; 370/252; 370/254; 370/351; 370/331; 370/428
(58) Field of Classification Search .......... 709/223; 455/63, 69; 370/252, 254, 468, 351
 See application file for complete search history.

(56) References Cited

U.S. PATENT DOCUMENTS

| 5,991,829 | A | 11/1999 | Giorgio et al. |
| 6,317,688 | B1* | 11/2001 | Bruckner et al. ............ 701/213 |
| 6,360,258 | B1 | 3/2002 | LeBlanc |
| 6,510,150 | B1 | 1/2003 | Ngo |
| 6,516,952 | B1 | 2/2003 | Wang et al. |
| 6,651,085 | B1 | 11/2003 | Woods |
| 2003/0036359 | A1* | 2/2003 | Dent et al. .................... 455/63 |
| 2004/0073361 | A1* | 4/2004 | Tzamaloukas et al. ...... 701/210 |
| 2005/0201415 | A1* | 9/2005 | Narsinh et al. .............. 370/469 |
| 2008/0055158 | A1* | 3/2008 | Smith et al. ................. 342/464 |

OTHER PUBLICATIONS

Welch, Greg, et al., "An Introduction to the Kalman Filter", http://www.cs.unc.edu/welch/media/pdf/kalman_intro.pdf, Department of Computer Sciences, University of North Carolina at Chapel Hill, Chapel Hill, NC 27599-3175, pp. 1-16 (updated May 23, 2003).
Maybeck, Peter S., "Chapter 1 Introduction", Stochastic models, estimation, and control, vol. 1, Department of Electrical Engineering, Air Force Institute of Technology, Wright-Patterson Air Force Base, OH pp. 16 (1979).

* cited by examiner

*Primary Examiner*—Jude J Jean Gilles

(57) ABSTRACT

Systems, methods, and device are provided for network and network device management. One method embodiment includes receiving information associated with a network device. The method further includes analyzing the network information using a Kalman filter.

39 Claims, 2 Drawing Sheets

NETWORK DEVICE APPLYING KALMAN FILTER

BACKGROUND

Computing networks can include multiple network devices such as servers, desktop PCs, laptops, workstations, PDA's, and wireless phones, among other peripheral devices, e.g., printers, facsimile devices, and scanners, networked together across a local area network (LAN) and/or wide area network (WAN). A LAN and/or WAN uses clients and servers that have network-enabled operating systems such as Windows, Mac, Linux, and Unix. An example of a client includes a user's workstation. The servers can hold programs and data that are shared by the clients in the computing network.

A networking operating system implements protocol stacks and device drivers for networking hardware. One example of a protocol stack includes the open system interconnection (OSI) model. The OSI model is an ISO standard for worldwide communications that defines a framework for implementing protocols in seven layers. Control is passed from one layer to the next, starting at the application layer in one station, and proceeding to the bottom layer, over the channel to the next station and back up the hierarchy. Most of the functionality in the OSI model exists in all communications systems, although two or three OSI layers may be incorporated into one. Other protocol stack models include that used in transmission control protocol/internet protocol (TCP/IP) as well as the signaling system 7 (SS7) model as the same are known and understood by those of ordinary skill in the art.

A network device having processor logic and memory, such as the network devices described herein, includes an operating system layer and an application layer to enable the device to perform various functions or roles. The operating system layer includes a master control program that runs the network device. As understood by one of ordinary skill in the art, the master control program provides task management, device management, and data management, among others. The operating system layer communicates with program applications running thereon through a number of APIs. The APIs include a language and/or message format used by an application program to communicate with the operating system. The language and/or message format of the APIs allow an operating system to interpret executable instructions received from program applications in the application layer and return results to applications.

As mentioned above, network devices in a LAN and/or WAN include hardware components, such as trunk lines, switches, routers, hubs, wireless access points, servers, and databases. LANs and/or WANs can also include software, application modules, firmware, and other computer executable instructions operable thereon.

Network devices such as switches, hubs, routers, and wireless access points, for example, are used to distribute and restrict traffic within workgroups of a network. Network devices can also provide filtering of inter or intra network traffic for security purposes and policy management. These sorts of network device functionality can also be incorporated into other devices within a network environment, such a file server, a load balancing device or other such network appliance.

Managing network communication between network devices in the network can be provided by various network protocols including, but not limited to, simple network management protocol (SNMP), common management information protocol (CMIP), distributed management environment (DME), extensible markup language (XML), telnet protocol, and internet control message protocol (ICMP) to name a few. ICMP is a TCP/IP protocol used to send error and control messages. A network device may use ICMP to notify a sender that its destination node is not available. For example, a ping utility sends ICMP echo requests to verify the existence of an IP address. The ping is used to identify a network device status, e.g., whether the network device is up or down.

Any number of network devices, such as those mentioned above, may be included in a network. In some situations, network devices can go offline or malfunction. Additionally, network devices and computing networks can come under attack from outside sources such as malicious code, e.g., worms and viruses, and malicious users, e.g., port scanners, denial of service attacks and the like. In such cases, the integrity of network devices can be compromised, e.g., sensitive information disclosed, backdoors planted, and availability of a computing network can be severely to catastrophically degraded. A router is one example of a good sensing point to track unusual or abnormal network data traffic and/or behavior although other sensing points such as switches, access points, or other network infrastructure devices may also be used. Routers may be set with a predetermined threshold to limit logical network-level connections to a network device or destination endpoint. However, such static thresholds do not accommodate valid random events. Some computing networks employ program applications which use linear feedback algorithms as part of managing network communications. Again, similar to the static thresholds in routers, such linear feedback algorithms do not accommodate valid random network events. As a result, such approaches can produce a measurable occurrence of false positive, e.g., network flag/alarm signals when they are inappropriate, as well as missed events or false negatives, e.g., no indication of network flag/alarm signals when they are indeed appropriate. Further, linear feedback algorithms are unable to estimate data traffic and/or event rate or number for future events, e.g., such program applications do not learn from network activity and are reactive rather than proactive.

DETAILED DESCRIPTION

Figure 1:
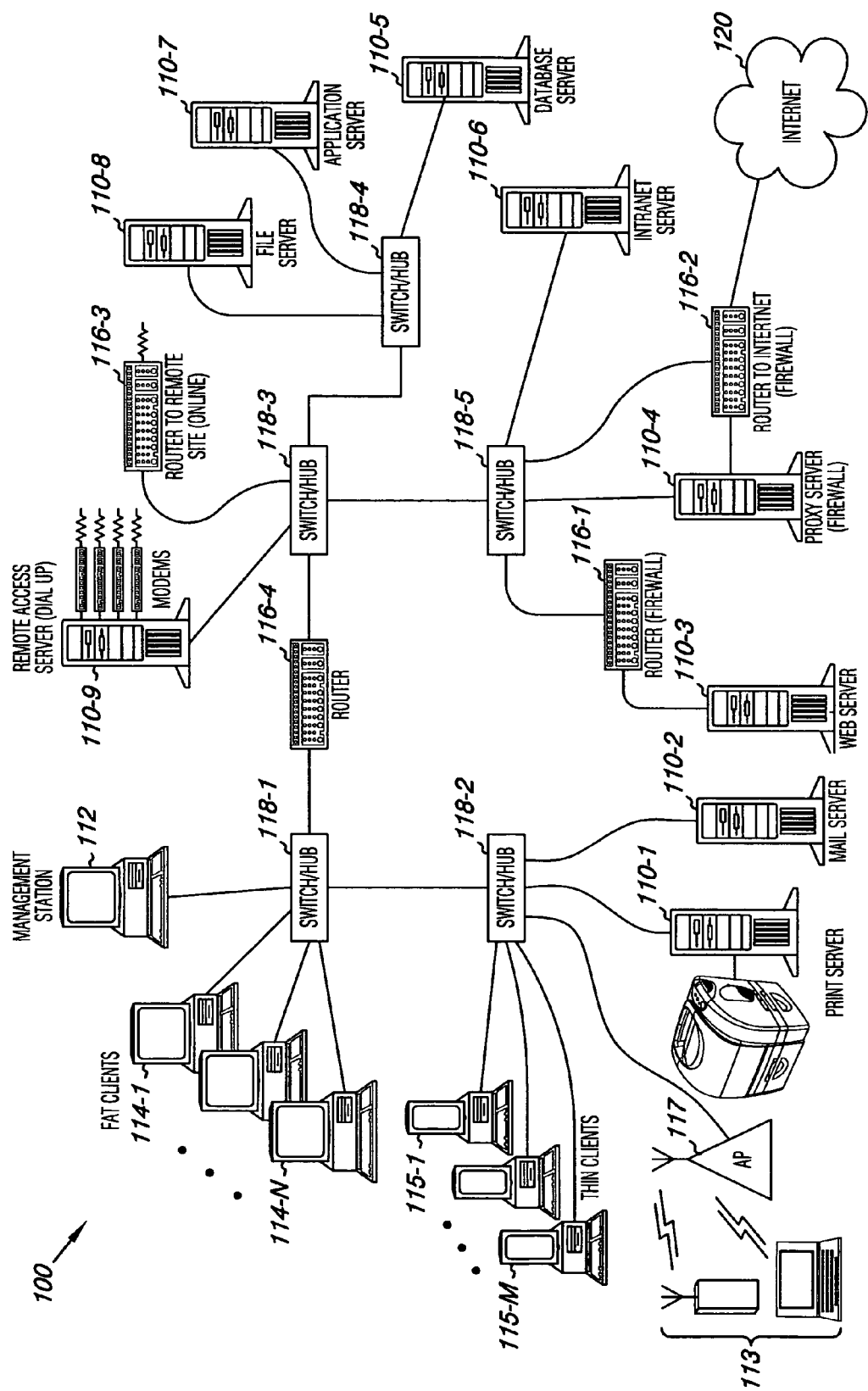
FIG. 1 is an embodiment of a computing device network.

Embodiments of the present invention include program applications that execute instructions (e.g., computer executable instructions) to regulate external network stimuli in a manner which reduces degraded network performance to network devices and/or destination endpoints in connection with network data traffic. Examples of network stimuli include, but are not limited to, media access control (MAC) layer addressing and internet protocol flow and routing. Embodiments of the present invention likewise include program applications that execute instructions to detect and report unusual or abnormal network device and/or computing network events, e.g., transmission control protocol (TCP) scanning, denial of service attacks, and the like.

According to various embodiments, the program applications execute instructions to harvest a wide range of information which is available from the devices attached to a network. For example, program application embodiments can execute instructions to transmit network management messages to network attached devices and collect response information from the network attached devices based on the network management messages. Additionally, program application embodiments periodically receive information from network attached devices without messaging such device.

The program application embodiments execute instructions to analyze the network and network device information using a Kalman filter to learn from and accommodate random network events. By applying the Kalman filter to received information, the program embodiments provide a more reliable technique for regulating network events and detecting abnormal network events. As a result, a reduced occurrence of false positives and false negatives is realized. As mentioned above, false positives include network flag/alarm signals when they are inappropriate and false negatives include no indication of network flag/alarm signals when they are indeed appropriate.

By applying the Kalman filter to received information, the program embodiments have an ability to estimate data traffic and/or event rate or number for future events. The program embodiments can then execute instructions which are proactive to protecting computing networks and network devices from potentially degraded network performance.

Although computing networks are discussed in the present application, one or ordinary skill in the art will appreciate that the embodiments described herein can be applicable to various different types of signaling networks, e.g., SS7 and TCP/IP networks, including satellite positioning networks and/or wireless communication networks, to name a few. As such, the program embodiments described herein which execute instructions to apply a Kalman filter in processing network events are not limited to computing networks. As one of ordinary skill in the art will appreciate upon reading this disclosure, anywhere there is a defined API between network layers in a protocol stack model program embodiments including a Kalman filter can be implemented between one layer and the next. By way of example, OSI signaling networks include seven network layers including the physical (PHY) layer, data link (MAC) layer, network layer, transport layer, session layer, presentation layer, and application layer. SS7 signaling networks include a transaction capabilities application part (TCAP) level connection, an integrated services digital network user part (ISUP) level connection, a mobile application part (MAP) level connection, and a signaling connection control point (SCCP) level connection, among others. And, TCP/IP signaling networks include a simple network management protocol (SNMP) level connection, a hyper text transport protocol (HTTP) and extensible markup language (XML) level connection, a telnet protocol level connection, and internet control message protocol (ICMP) level connection, among others as the same will be known and understood by one of ordinary skill in the art. Further discussion of the same is not included here so as not to obscure embodiments of the invention.

FIG. 1 is an embodiment of a computing device network 100. As shown in FIG. 1, a number devices can be networked together via a LAN and/or WAN via router, hubs, switches, bridges, wireless access points, and the like. The embodiment of FIG. 1 illustrates client and servers in a LAN. However, embodiments of the invention are not so limited. The embodiment shows one server for each type of service on a LAN. However, in practice several functions can be combined in one device or machine and, for large volumes, multiple devices or machines can be used to balance the traffic for the same service. For example, an enterprise system or network can include a collection of servers, or server farm, cooperating to provide services to the network.

FIG. 1 illustrates a print server 110-1 to handle print jobs for the network 100, a mail server 110-2, a web server 110-3, a proxy server (firewall), a database server 110-5, and intranet server 110-6, an application server 110-7, a file server 110-8, and a remote access server (dial up) 110-9. Again, the examples provided here do not provide and exhaustive list. The embodiment of FIG. 1 further illustrates a network management station 112, e.g., a PC or workstation, a number of "fat" clients 114-1, . . . , 114-N which can also include PCs and workstations and/or laptops, and a number of "thin" clients 115-1, . . . , 115-M which can include terminals and/or peripherals such as scanners, facsimile devices, handheld multifunction device, and the like. The designators "N" and "M" are used to indicate that a number of fat or thin clients can be attached to the network 100. The number that N represents can be the same or different from the number represented by M. As shown in the embodiment of FIG. 1, certain devices, e.g., clients such as portable handsets (cell phones, PDA's, and Blackberries, etc.) and laptops 113, can connect wirelessly (e.g., via RF, 802.11 standards, and Bluetooth, etc.) to the network 100 via a wireless access point (AP) 117 as the same are known and understood by one of ordinary skill in the art. The embodiment of FIG. 1, illustrates that all of these example network devices can be connected to one another and/or to other networks via routers, 116-1, 116-2, 116-3, and 116-4, and hubs and/or switches 118-1, 118-2, 118-3, 118-4, and 118-5, as the same are know and understood by one of ordinary skill in the art. Embodiments of the invention, however, are not limited to the number and/or quantity of network devices in FIG. 1's illustration.

As one of ordinary skill in the art will appreciate, many of these devices include processor and memory hardware. By way of example and not by way of limitation, the network management station 112 will include a processor and memory as the same are well know to one of ordinary skill in the art. Embodiments of the invention are not limited, for the various devices in the network, to the number, type or size of processor and memory resources.

Program embodiments (e.g., computer executable instructions), as described in more detail below, can reside on the network management station 112. Embodiments, however, are not so limited. That is, a program embodiment can be resident on the network 100 in the memory of the network management station 112, and executable by the processor thereon. Additionally, however, the program embodiments can be resident on one or more routers, 116-1, 116-2, 116-3, and 116-4, wireless access points 117, one or more bridges, hubs and switches 118-1, 118-2, 118-3, 118-4, and/or elsewhere on a network infrastructure device in a distributed computing network 100 as the same will be understood upon reading this disclosure.

The program embodiments can execute instructions in conjunction with a network management program, which employs a protocol such as SNMP, ICMP, XML, etc., to collect response information from the various network attached devices shown in FIG. 1. For example, the program embodiments execute instructions to collect response messages, and associated information, returned in response to network management messages sent as SNMP messages and/or ICMP pings. As one of ordinary skill in the art will appreciate, data can be passed from SNMP agents, which are hardware, firmware, and/or software processes, or combinations thereof, reporting activity in each network device (e.g., hub, switch, server, peripheral, router, workstation, laptop, etc.) to the management workstation 112. The agents can return information contained in a management information base (MIB) of the network attached device. The MIB is a data structure that defines what is obtainable from the device and what can be controlled, measured, or monitored, turned off, turned on, etc.

Additionally, however, the program embodiments execute instructions to receive information from network attached devices, such as shown in FIG. 1, without explicitly messaging such devices. That is, in various embodiments information received from network devices can be initiated by a network attached device and not received in response to a particular request. For example, a network device may periodically initiate and transmit messages to a network management program which are not in response to an SNMP message or ICMP ping.

The received information can include messages selected from the group of; messages reporting successful events, messages reporting the violation of a traffic threshold, and messages reporting a non-functioning component on a network attached device. One example includes receiving a message, e.g., initiated from a network device to a management program, which reports that a packet of data has been successfully sent from a port on the device. Another example includes receiving a message, initiated from a network device to a management program, which reports the device's processor utilization, memory utilization, link status, and local area network (LAN) utilization, among other information. The received network information can similarly include a link up/down status, statistics, including but not limited to, discards, CRC (cyclical redundancy checking) or FCS (frame check sequence) errors and number of broadcasts, a trap receipt, device and/or network buffer utilization, and other device and/or network error receipts. One of ordinary skill in the art will appreciate upon reading this disclosure the manner in which device processor utilization, device memory utilization, a link up/down status, discards, CRC or FCS errors, trap receipts, device buffer utilization, and other device error receipts can be received. One of ordinary skill in the art will further appreciate the utility of these various types of information. For example, receipt of an interrupt trap will cause instructions to wait for a particular interrupt to occur and then execute a corresponding routine in order to test for a particular condition in a running program. Receipt of an error trap includes instructions which execute to test for an error condition and to provide a recovery routine. And, a debugging trap includes instructions to wait for the execution of a particular instruction in order to stop the program and analyze the status of a system at that moment.

Thus information can be received either in response to network management messages, e.g., SNMP messages and/or ICMP pings, or as unsolicited device message information sent from more intelligent network attached devices in more intelligent computing networks. Upon reading this disclosure, one of ordinary skill in the art will appreciate that the embodiments of the invention are not limited to the examples given above. This information when processed by the program embodiments applying a Kalman filter, as described in more detail below, can distinguish between valid network events and abnormal network events to reduce false positives and false negatives.

A Kalman filter is a recursive solution to discrete-data linear filtering. A Kalman filter is a set of mathematical equations that provides an efficient computational (e.g., recursive) solution of the least-squares method, as understood by one of ordinary skill in the art. The Kalman filter is a stochastic algorithm for treatment and/or processing of random processes such as may occur in a computing network and for which examples are given below. The filter is powerful in several aspects: it supports estimations of past, present, and even future states, and it can do so even when the precise nature of a modeled system, e.g., computing network, is unknown. Various literature describing the operation of Kalman filters is available, including a white paper entitled, "An Introduction to the Kalman Filter", Greg Welch and Gary Bishop, TR 95-041, Department of Computer Science, University of North Carolina at Chapel Hill.

The program embodiments execute instructions to collectively analyze received network information based on the application of a Kalman filter, examples of which are explained in more detail below. As one of ordinary skill in the art will appreciate upon reading this disclosure, applying a Kalman filter to received network information enables the program embodiments to distinguish between valid network events and abnormal network events to reduce false positives and false negatives and to regulate external network stimuli in a manner which reduces degraded network performance to network devices and/or destination endpoints in connection with network data traffic.

Figure 2:
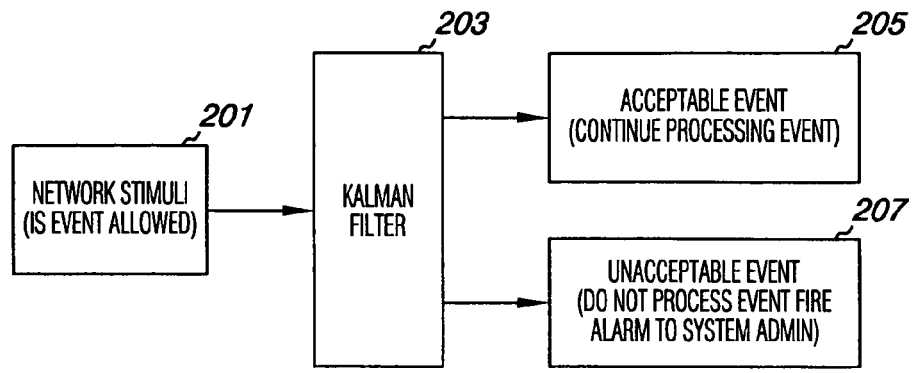
FIG. 2 illustrates an embodiment of a computing device applying a Kalman filter.

FIG. 2 illustrates an embodiment of a computing device applying a Kalman filter. As shown in the embodiment of FIG. 2, network stimuli 201 can be received at a network management station (e.g. 112 in FIG. 1) and operated thereon by program embodiments including a Kalman filter 203 (e.g., computer executable instructions). The program embodiments can be resident on the network management station in memory and executable by a processor thereon. Embodiments, however, are not so limited. That is, network stimuli 201 can be received at a one or more routers (e.g., 116-1, 116-2, 116-3, and 116-4 in FIG. 1), wireless access points (e.g., 117 in FIG. 1) one or more bridges, hubs and switches (e.g., 118-1, 118-2, 118-3, 118-4 in FIG. 1), and/or elsewhere on a network infrastructure device in a distributed computing network and operated thereon by program embodiments including a Kalman filter 203 resident in memory of such a network device and executable by a processor thereon. Thus, the program embodiments execute instructions to process received network information, as described above, either from a network device on which the program instructions themselves are resident and/or from another network device connected to the device on which the program instructions are resident. As noted above, examples of network stimuli include, but are not limited to, media access control (MAC) layer addressing and internet protocol (IP) flow and routing. Although MAC layer addressing and IP flow and routing are discussed in examples below, program embodiments including a Kalman filter 203 can be implemented anywhere there is a defined API, e.g., program embodiments can be integrated between one layer of a protocol stack and the next (e.g., in an OSI model, TCP/IP model, SS7 model and the like).

By application of various program embodiments including a Kalman filter 203, instructions are executed in connection with the received network information to regulate external network stimuli in a manner which reduces degraded network performance to network devices and/or destination endpoints in connection with network data traffic. Additionally, by application of various program embodiments including a Kalman filter 203, instructions are executed in connection with the received network information to detect and report unusual or abnormal network device and/or computing network events, e.g., TCP port scanning, denial of service attacks, and the like as the same will be known and understood by one of ordinary skill in the art.

As illustrated in the embodiment of FIG. 2, if upon applying the Kalman filter 203 to the received information in executing the program embodiments the result is a determination that an event is acceptable then the program instructions will execute to continue processing the event as shown at 205. However, if upon applying the Kalman filter 203 to the received information in executing the program embodiments the result is a determination that a given event is unacceptable then the program instructions will execute to cease processing or not process the event and can generate an alert signal, e.g., to a network administrator or other user, as shown at 207.

To further illustrate, by way of example and not by way of limitation, a network device such as a switch is able to track and/or report information, e.g. to program embodiments described herein, on the level of traffic it is experiencing and/or the routing flow to particular endpoint destinations, e.g., a particular database. One of ordinary skill in the art will appreciate the manner in which a network device such as a switch can execute instructions to track and/or report information (e.g., to a network management station or elsewhere in a distributed network where the program embodiments can be resident) on the level of traffic the device is experiencing. By analyzing this information with use of the program embodiments having a Kalman filter 203, the program embodiments can distinguish, for example, whether the switch is generating an inordinate amount of traffic to a particular database. As noted in the embodiment of FIG. 2, if upon applying the Kalman filter 203 to the received information, e.g., IP flow and/or traffic routing information, the program embodiments execute to determine that the traffic level is acceptable or appropriate then the program instructions will execute to continue processing the event, e.g., the reported traffic level. In this example, the switch may continue routing network traffic flow to a given endpoint destinations, e.g., a particular database. As used herein network traffic flow is intended to include headers, protocol information, and the like, as well as the data associated therewith, e.g., voice, data, video type signals, etc.

Likewise, as noted in the embodiment of FIG. 2, if upon applying the Kalman filter 203 to the received information, e.g., IP flow and/or traffic routing information, the program embodiments execute to determine that the traffic level is unacceptable or inappropriate then the program instructions can execute to discontinue processing the event, e.g., halt or arrest the network traffic flow through that particular switch to the given endpoint, e.g., database. Additionally, however, the program embodiments can execute instructions to implement proactive network actions. For example, the program instructions can additionally execute instructions to convert a destination endpoint such as a database into a hub in order to reduce a degradation in network performance. One of ordinary skill in the art will appreciate upon reading this disclosure the manner in which program instructions can execute instructions to convert a destination endpoint such as a database into a hub.

As another example, a network device such as a router processes network data traffic between two network entities, including endpoints or otherwise. Routers are provided with executable instructions to track connection rate and/or IP flow and routing. Routers may also include program instructions having thresholds to limit or restrict the number and/or rate of connections before an ameliorative action is taken. One or ordinary skill in the art will recognize upon reading this disclosure the manner in which such program instructions may be provided to routers either as firmware, software, etc. Additionally, however, a network device such as a router can be provided with program embodiments described herein which execute to apply a Kalman filter in processing network data traffic through the router, e.g., in processing connection rates and/or IP flow and routing information. By analyzing this information with use of the program embodiments having a Kalman filter 203, the program embodiments can distinguish, for example, whether the router should adjust its connection rate thresholds and/or report an alert signal, e.g., to a network management station or otherwise. As noted in the embodiment of FIG. 2, if upon applying the Kalman filter 203 to the device information, e.g., IP flow and/or traffic routing information, the program embodiments execute to determine that the network traffic level is acceptable or appropriate then the program instructions will execute to continue processing the information and can execute additional instructions to automatically calibrate and adjust its threshold limits to accommodate the network traffic level.

Likewise, as noted in the embodiment of FIG. 2, if upon applying the Kalman filter 203 to the received information, e.g., IP flow and/or traffic routing information, the program embodiments execute to determine that the processed traffic level is unacceptable or inappropriate then the program instructions can execute to discontinue processing the event, e.g., halt or arrest the network traffic flow through that particular router and can execute additional instructions to automatically calibrate and adjust its threshold limits for connection rates to appropriately accommodate the network traffic level. One of ordinary skill in the art will appreciate upon reading this disclosure the manner in which program embodiments can execute instructions to automatically calibrate and adjust the routers threshold limits for connection rates.

Thus, the program embodiments execute instructions, applying a Kalman filter, such that a network device can learn in a proactive manner how to accommodate, predict, and/or estimate future events so as reduce a likelihood of errantly generating false positives or inappropriately failing to report false negatives due to granular or large changes in network activity.

Embodiments of the invention are not limited to the examples given above. One of ordinary skill in the art will appreciate the manner in which program embodiments executing instructions to analyze received network information by applying a Kalman filter can implement other alert actions and/or proactive network actions. Thus, program embodiments using a Kalman filter 203 can be implemented anywhere there is a defined API, e.g., program embodiments can be integrated between one layer of a protocol stack and the next (e.g., in an OSI model, TCP/IP model, SS7 model and the like). Further examples are given below in connection with the method embodiment discussion.

One of ordinary skill in the art will appreciate the manner in which the program embodiments, as described herein, can be provided to a network and/or network device. One example includes loading the programs from a floppy disk, CD, or other medium of the like and in order to perform a software and/or firmware update to a device on the network, e.g., to a network management station 112 shown in network 100 of FIG. 1. Similarly, the program embodiments can be downloaded from a remote source over a network connection such as the Internet. Embodiments, however, are not limited to these examples.

In conjunction with the program embodiments, icons can be presented on a display, e.g., a display of a network management station 112 in Figure. An icon can be displayed for each network device within a network and be used to visually display text and/or graphical alert signal information, such as described above, when abnormal levels of network activity are occurring in association with a particular device. Embodiments of the invention, however, are not limited to a particular type of alert signal.

Figure 3:
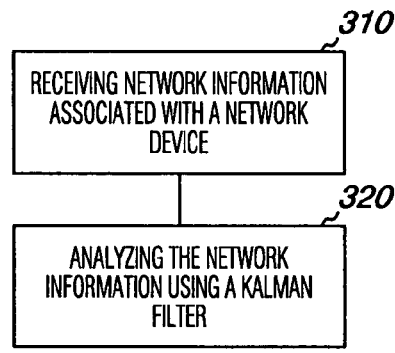
FIGS. 3-4 illustrate various method embodiments for a network and network device applying a Kalman filter.
Figure 4:
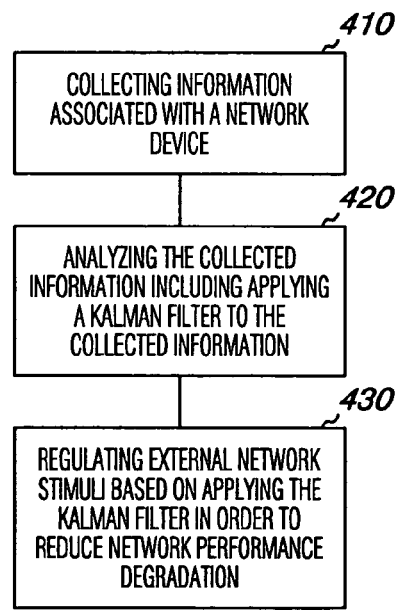

FIGS. 3-4 illustrate various method embodiments for a network and network device applying a Kalman filter. As one of ordinary skill in the art will understand, the embodiments can be performed by software, application modules, and computer executable instructions operable on the systems and devices shown herein or otherwise. The invention, however, is not limited to any particular operating environment or to software written in a particular programming language. Software, application modules and/or computer executable instructions, suitable for carrying out embodiments of the present invention, can be resident in one or more devices or locations or in several devices and location in a network.

Unless explicitly stated, the method embodiments described herein are not constrained to a particular order or sequence. Additionally, some of the described method embodiments can occur or be performed at the same point in time.

FIG. 3 illustrates a method embodiment associated with a network and network device applying a Kalman filter. In the embodiment of FIG. 3, the method includes receiving network information associated with a network device as shown at block 310. The network device can include any network device such as the network device examples shown in FIG. 1, e.g., routers, hubs, switches, bridges, wireless access points, servers, clients, etc. The network information can include processor utilization, memory utilization, link status, and local area network (LAN) utilization, link up/down status, statistics, including but not limited to, discards, CRC (cyclical redundancy checking) or FCS (frame check sequence) errors and number of broadcasts, a trap receipt, device and/or network buffer utilization, and other device and/or network error receipts, and/or other information associated with a network such as discussed in connection with FIG. 1. As one of ordinary skill in the art will appreciate upon reading this disclosure, network information can include network stimuli including, but are not limited to, media access control (MAC) layer addressing and internet protocol flow and routing network information. However, network information can also include network stimuli from network layers, transport layers, session layers, presentation layers, application layers, etc., such in the OSI stack model and from equivalent layers in other protocol stack models, e.g. TCP/IP and SS7 models. Information can be received as information in the form of a network management message, e.g., an SNMP, ICMP, or other similar message as the same are know and understood by one ordinary skill in the art on one or more network devices in a network having program embodiments that apply a Kalman filter as described herein.

As shown in the embodiment of FIG. 3, the method further includes analyzing the network information using the program embodiments having a Kalman filter as shown at block 320. As described above, analyzing the network information using program embodiments having a Kalman filter includes executing instructions which process the network information to distinguish between valid network events and abnormal network events in a manner that can reduce false positives and false negatives. As noted, the Kalman filter is a set of mathematical equations that provides an efficient computational (e.g., recursive) solution of the least-squares method, as understood by one of ordinary skill in the art. The Kalman filter is a stochastic algorithm for treatment and/or processing of random processes such as may occur in a computing network, or other type of network. The application of the Kalman filter as part of the program embodiments is powerful in that it supports estimations of past, present, and even future states, and it can do so even when the precise nature of a modeled system, e.g., computing network, is unknown.

By way of example, and not by way of limitation, a network device is provided with program embodiments which execute to receive media access control (MAC) layer addressing information. One of ordinary skill in the art will understand upon reading this disclosure the nature of MAC layer addressing that occurs between the MAC layer and physical (PHY) layer within a network device. Further discussion is not included here so as not to obscure the embodiments of the invention. As the program embodiments execute to receive the MAC layer addressing information, the program will execute to track and learn to which ports, access points, data ports, etc., on the network clients are connecting and/or the time of day and activity levels of such connections. As has been described above the program embodiments in applying a Kalman filter to these networks events provides a effective detection mechanism to learn and to distinguish between random network events which are acceptable, e.g., a significant increase in network connections at 8:00 AM in the morning of a work day when everyone using the network initially turns on their machines to connect to the network, and other random network events which are not acceptable, e.g., a significant increase in network connections at 1:00 AM in the morning.

FIG. 4 illustrates another method embodiment associated with a network and network device applying a Kalman filter. According to various embodiments, the method can be used for network and network device monitoring and management. In the embodiment of FIG. 4, the method includes collecting information associated with a network device, such as the devices illustrated in FIG. 1, at block 410. Collecting information associated with a network device includes program instructions which execute to receive network information from a device, e.g., MIB data or otherwise as the same has been described in connection with FIGS. 1-3.

In block 420 the method includes analyzing the collected information including applying a Kalman filter to the collected information. Analyzing the collected information and applying a Kalman filter includes program embodiments which execute to process the collected information according to a Kalman filter algorithm as the same has been described above in connection with FIGS. 1-3. That is, the program embodiments execute instructions, applying a Kalman filter, such that events such as IP traffic flow, routing, MAC layer addressing behavior, and other network stimuli from network layers in a given protocol stack model, occurring on a network is learned over a period of network operation. In this manner, program applications executing to apply the Kalman filter will be proactive to accommodate, predict, and/or estimate future events so as reduce a likelihood of errantly generating false positives or inappropriately failing to report false negatives due to granular or large changes in network activity.

In the embodiment of FIG. 4, the method further includes regulating external network stimuli, e.g., MAC layer addressing, IP flow, traffic routing, and other network stimuli from network layers in a given protocol stack model, based on applying the Kalman filter in order to reduce network performance degradation as shown in block 430. For example, as illustrated in connection with FIG. 3, program embodiments applying a Kalman filter can execute instructions to determine that a significant increase in MAC layer addressing on a network device during a work day may only represent an appropriate increased use level on a machine attributable to action on a valid work project. Accordingly, as described in connection with FIG. 2, the program embodiments can execute instructions to continue processing such a network and/or network device event. Similarly, the program embodiments applying a Kalman filter can execute instructions to determine that a significant increase in MAC layer addressing on a network device at 3:00 AM in the morning represents an inappropriate increased use level on a machine which is not attributable to action on a valid work project. Accordingly, as described in connection with FIG. 2, the program embodiments can execute instructions to discontinue access to the MAC layer in order to protect the network device from deleterious external network stimuli which may degrade the network device and/or network.

As a another example, by way of illustration and not by way of limitation, the program embodiments can execute instructions and apply the Kalman filter to process network information indicative of traffic level at a particular switch in the network. Application of the Kalman filter with the program embodiments may reveal that the switch is attempting to connect network traffic to end nodes, e.g. destination points in the network such as a printer, fax, database, or otherwise, which are no longer connected to the network. In this example, the program embodiments can execute instructions to convert the switch to a hub, based on the Kalman filter analysis, in order to send the network traffic elsewhere in the network to a comparable, end point network device. Again, one of ordinary skill in the art will appreciate upon reading this disclosure the manner in which program instructions, e.g., provided as firmware and/or software, can execute to convert a switch to a hub based. Instructions to perform such a conversion can be generated and output to the network device as a result of program embodiment processing network information using a Kalman filter.

As yet another example, the program embodiments can be embedded as firmware and/or software on a router. Thereon the program embodiments can execute instructions and apply the Kalman filter to detect IP flow and routing through the router network device. As noted above, the program embodiments execute instructions, applying a Kalman filter, such that events such as IP traffic flow and routing is learned over a period of network operation. In this manner, program applications executing to apply the Kalman filter will be proactive to accommodate, predict, and/or estimate future events so as reduce a likelihood of errantly generating false positives or inappropriately failing to report false negatives due to granular or large changes in network activity. In this example, a given router may have a threshold set to limit a rate and number of connections. Additionally, however, the program embodiments of the present invention, applying a Kalman filter, enable the router network device to effectively assess network event activity even when the rate and number of connections through the router is below the set threshold. For example, an occurrence of a significant decrease in the rate and number of connections through a particular router at a particular time of day can also be an indication of a deleterious network event, e.g. degrading network performance. As the program embodiments execute instructions to analyze this random network event information with the benefit of a Kalman filter, the program instructions can execute to determine whether this significant decrease in the rate and number of connections through a particular router at a particular time of day is acceptable or unacceptable and justification to send an alarm or alert signal, e.g., to a network administrator. As one of ordinary skill in the art will appreciate, without the program embodiments applying a Kalman filter an instance in which the decrease in the rate and number of connections through the particular router at a particular time of day is unacceptable and justification to send an alarm or alert signal may well have resulted in a false negative if relying alone on the limit threshold set in router.

Although a router has been illustrated in the above example, one of ordinary skill in the art will appreciate upon reading this disclosure that program embodiments including a Kalman filter can be implemented in other suitable sensing points such as switches, wireless access points, and/or that other network infrastructure devices can be implemented with the program embodiments to serve as a sensing point.

Thus, although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes any other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device, comprising:
   a processor;
   a memory coupled to the processor; and
   program instructions provided to the memory;
   wherein the computing device is a network event regulator device selected from the group of a wireless access point, a switch, a hub, and a router, and wherein the program instructions are executable by the processor to:
   transmit a network management message, using one of simple network management protocol (SNMP) or internet control message protocol (ICMP), over a network to a network device;
   collect response information from the network device based on the network management message; and
   analyze the response information including applying a Kalman filter to the collected response information.

2. The device of claim 1, further including program instructions which execute to regulate external network stimuli based on applying the Kalman filter to reduce degraded performance to the network.

3. The device of claim 1, further including program instructions which execute to signal when abnormal levels of activity are detected based on applying the Kalman filter.

4. The device of claim 1, further including program instructions which execute to track media access control (MAC) layer addressing and which execute to learn network events based on applying the Kalman filter as other devices connect to the network.

5. The device of claim 1, further including program instructions which execute to track internet protocol (IP) flow and routing and which execute to learn network events based on applying the Kalman filter as other devices connect to the network.

6. The device of claim 5, further including program instructions which execute to track IP flow and routing at a network device selected from the group of a switch, a hub, a database, a security appliance, a wireless access point device, a network intrusion device, and a router.

7. The device of claim 1, further including program instruction which execute to track information between various network layers in a given protocol stack model and which execute to learn network events based on applying the Kalman filter to the tracked information.

8. The device of claim 7, wherein the various network layers include network layers in a protocol stack model selected from the group of:
- an OSI protocol stack model;
- an SS7 protocol stack model; and
- a TCP/IP protocol stack model.

9. The device of claim 7, wherein the various network layers include network layers selected from the group of:
- a TOP port-level connection;
- a session level connection;
- a presentation level connection;
- an application level connection;
- a transaction capabilities application part level (TCAP) level connection;
- an integrated services digital network user part (ISUP) level connection;
- a mobile application part (MAP) level connection; and
- a signaling connection control point (SCCP) level connection.

10. A computing device, comprising:
- a processor;
- a memory coupled to the processor; and
- program instructions provided to the memory and executable by the processor to:
  - collect traffic flow amount information from a network device connected to the computing device over a network;
  - analyze the collected traffic flow amount information including applying a Kalman filter to the collected traffic flow amount information; and
  - limit amount of traffic flow through the network device based on applying the Kalman filter to reduce degraded performance on the network.

11. The computing device of claim 10, further including collecting information from the network device selected from the group of:
- processor utilization;
- memory utilization;
- link up/down status;
- traps;
- buffer utilization;
- local area network (LAN) utilization; and
- statistics including discards, cyclical redundancy checking (CRC) and frame check sequence (FCS) errors and number of broadcasts.

12. The computing device of claim 10, further including program instructions which execute to automatically calibrate a threshold in the network device used to control a connection rate to the network device.

13. The computing device of claim 12, further including program instructions which execute to convert the network device to perform a different role.

14. The computing device of claim 13, further including program instructions which execute to convert a network database to serve as a network hub.

15. The computing device of claim 13, further including program instructions which execute to convert a network switch to a network hub.

16. The computing device of claim 10, further including program instructions which execute to track media access control (MAC) layer addressing and, based on applying the Kalman filter, execute to reduce false positives and false negatives.

17. The computing device of claim 10, further including program instructions which execute to track internet protocol (IP) flow and routing and, based on applying the Kalman filter, execute to reduce false positives and false negatives.

18. The computing device of claim 10, wherein the network device includes a network device selected from the group of:
- a switch;
- a hub;
- a database;
- a security appliance;
- a wireless access point device;
- a network intrusion device; and
- a router.

19. The computing device of claim 10, wherein the network device and the computing device are connected over a local area network (LAN).

20. The computing device of claim 10, wherein the network device and the computing device are connected over a wireless wide area network (WAN).

21. A method for network and network device management, comprising:
- receiving network information associated with a network device;
- analyzing the network information using a Kalman filter;
- receiving network information associated with a device selected from the group of a switch, a hub, a database, a security appliance, a wireless access point device, a network intrusion device, and a router; and
- receiving response information to an SNMP message sent to the network device;
- wherein the network information includes media access control (MAC) layer addressing and internet protocol flow and routing information.

22. The method of claim 21, wherein the method includes receiving information contained in a management information base (MIB) of the network device.

23. The method of claim 21, wherein the method includes using a software agent embedded in the network device to receive and analyze the network information.

24. The method of claim 21, wherein the method includes receiving media access control (MAC) layer addressing information.

25. The method of claim 21, wherein the method includes receiving internet protocol (IP) flow and routing information.

26. The method of claim 21, wherein the method includes:
- receiving information communicated between various network layers in a given protocol stack model; and
- learning network events based on applying the Kalman filter to the received information.

27. The method of claim 21, wherein the method includes reducing false positives and false negatives based on applying the Kalman filter to received network information.

28. The method of claim 21, wherein the method includes regulating external network stimuli based on applying the Kalman filter to received network information.

29. The method of claim 21, wherein the method includes producing an alert signal when abnormal levels of activity are detected based on analyzing the network information using the Kalman filter.

30. A method for network and network device management, comprising:
   collecting traffic flow amount information associated with a network device;
   analyzing the collected traffic flow amount information including applying a Kalman filter to the collected traffic flow amount information; and
   limiting an amount of traffic flow through the network device based on applying the Kalman filter in order to reduce network performance degradation.

31. The method of claim 30, wherein the method includes receiving media access control (MAC) layer addressing information and learning network events based on applying the Kalman filter to the MAC layer addressing information.

32. The method of claim 30, wherein the method includes receiving internet protocol (IP) flow and route information and learning network events based on applying the Kalman filter to the IP flow and route information.

33. The method of claim 30, wherein the method includes converting the network device from a first role to a second role based on applying the Kalman filter to the collected information.

34. The method of claim 30, wherein the method includes automatically calibrating a threshold in the network device used to control a connection rate to the network device based on applying the Kalman filter to the collected information while the network device is in network use.

35. A computer readable medium having instructions for causing a device to perform a method, comprising:
   receiving network information associated with a network device;
   analyzing the network information using a Kalman filter;
   receiving network information associated with a device selected from the group of a switch, a hub, a database, a security appliance, a wireless access point device, a network intrusion device, and a router; and
   receiving response information to an SNMP message sent to the network device;
   wherein the network information includes media access control (MAC) layer addressing and internet protocol flow and routing information.

36. The medium of claim 35, wherein the method further includes automatically calibrating a threshold in the network device used to control a connection rate to the network device based on applying the Kalman filter to the network information while the network device is in network use.

37. The medium of claim 35, wherein the method further includes learning media access control (MAC) layer addressing events based on applying the Kalman filter to MAC layer addressing information.

38. The medium of claim 35, wherein the method further includes learning internet protocol (IP) flow and routing events based on applying the Kalman filter to IP flow and route information.

39. The medium of claim 35, wherein the method further includes converting the network device from a first role to a second role based on applying the Kalman filter to received network information.

* * * * *

UNITED STATES PATENT AND TRADEMARK OFFICE
CERTIFICATE OF CORRECTION

PATENT NO. : 7,693,975 B2 Page 1 of 1
APPLICATION NO. : 10/792325
DATED : April 6, 2010
INVENTOR(S) : Mauricio Sanchez It is certified that error appears in the above-identified patent and that said Letters Patent is hereby corrected as shown below:

In column 13, line 19, in Claim 9, delete "TOP" and insert -- TCP --, therefor.

Signed and Sealed this

Twenty-fourth Day of August, 2010

David J. Kappos
*Director of the United States Patent and Trademark Office*